(12) United States Patent
Pearson et al.

(10) Patent No.: US 7,463,781 B2
(45) Date of Patent: Dec. 9, 2008

(54) LOW OVERHEAD CONTEXT INTIALIZATIONS FOR ARITHMETIC VIDEO CODECS

(75) Inventors: Eric C. Pearson, Conestogo (CA); Harminder S. Banwait, Waterloo (CA)

(73) Assignee: LSI Corporation, Milpitas, CA (US)

( * ) Notice: Subject to any disclaimer, the term of this patent is extended or adjusted under 35 U.S.C. 154(b) by 959 days.

(21) Appl. No.: 10/824,152

(22) Filed: Apr. 14, 2004

(65) Prior Publication Data

US 2005/0232505 A1    Oct. 20, 2005

(51) Int. Cl.
*G06K 9/36* (2006.01)
*G06K 9/46* (2006.01)
*H04N 7/12* (2006.01)
*H04N 11/02* (2006.01)
*H04B 1/66* (2006.01)

(52) U.S. Cl. .................... 382/247; 375/240; 348/384.1
(58) Field of Classification Search ......... 382/232–253; 375/240–240.29; 348/384.1–424.2
See application file for complete search history.

(56) References Cited

U.S. PATENT DOCUMENTS

| | | | |
|---|---|---|---|
| 5,442,458 A * | 8/1995 | Rabbani et al. ............ | 382/247 |
| 6,075,471 A * | 6/2000 | Kimura et al. .............. | 341/107 |
| 6,825,782 B2 * | 11/2004 | Bossen ....................... | 341/107 |
| 6,856,701 B2 * | 2/2005 | Karczewicz et al. ........ | 382/247 |
| 7,026,961 B2 * | 4/2006 | Pearson et al. ............... | 341/50 |
| 7,061,410 B1 * | 6/2006 | Pearson et al. ............. | 341/107 |
| 7,206,456 B2 * | 4/2007 | Hannuksela et al. ........ | 382/243 |
| 7,339,507 B1 * | 3/2008 | Guo et al. ................... | 341/107 |
| 7,369,066 B1 * | 5/2008 | Benzreba et al. ............. | 341/51 |
| 7,397,401 B2 * | 7/2008 | Banwait et al. ............. | 341/107 |
| 2004/0240559 A1 * | 12/2004 | Prakasam et al. ...... | 375/240.25 |
| 2005/0219069 A1 * | 10/2005 | Sato et al. .................... | 341/50 |

OTHER PUBLICATIONS

Marpe, D.; Schwarz, H.; Wiegand, T., "Context-based adaptive binary arithmetic coding in the H.264/AVC video compression standard," Circuits and Systems for Video Technology, IEEE Transactions on, vol. 13, No. 7, pp. 620-636, Jul. 2003.*

* cited by examiner

*Primary Examiner*—Jingge Wu
*Assistant Examiner*—Manav Seth
(74) *Attorney, Agent, or Firm*—Christopher P. Maiorana, PC

(57) ABSTRACT

A method for controlling an arithmetic codec context is disclosed. The method may include the steps of (A) reading a current value indicating one of a first condition and a second condition corresponding to a current context of a plurality of predetermined contexts, (B) generating an input state matching (i) an initial state in response to the first condition and (ii) an output state in response to the second condition, wherein the initial state has a predetermined value and the output state has a value generated by the method before receiving the current context and (C) generating a current output state by performing an arithmetic code operation on an input signal using the input state.

20 Claims, 3 Drawing Sheets

US 7,463,781 B2

LOW OVERHEAD CONTEXT INTIALIZATIONS FOR ARITHMETIC VIDEO CODECS

FIELD OF THE INVENTION

The present invention relates to arithmetic codecs generally and, more particularly, to a low overhead context initialization for arithmetic video codecs.

BACKGROUND OF THE INVENTION

The H.264 specification video codec contains a context adaptive binary arithmetic-coding (CABAC) method as part of a main profile. Every iteration of the CABAC method employs a context index to determine a model from a table upon which a single cycle of arithmetic coding is performed, after which a modified state is stored away. The CABAC method is computationally intensive and inherently serial in nature so effective use of CABAC hardware becomes imperative. However, for each video slice (which contains from one to a full frame of 16×16 macroblocks), an initial state of the context is reinitialized. With 399 contexts, each initialization consumes a considerable amount time. The initialization time is so significant that slice rate limits were added as a normative part of the H.264 specification. An added complication is an existence of four different sets of initialization parameters with the correct one being signaled in the bit stream at the start of a slice and a scaling factor (i.e., 0-51) applied to calculate the initial state for each context. Some slice types do not use all 399 contexts so some optimization is possible.

Several conventional solutions exist to perform the initialization. A first conventional solution is to loop through the 399 contexts, one at a time, and perform both a table lookup and scaling to determine the initial state. However, the time used to loop through the contexts and scale takes away from coding operation time. A second conventional solution is to loop through the 399 contexts and scaling several context at a time. The second solution involves multiple simultaneous initializations that increase a hardware cost (i.e., area) due to wider memory constraints and multiple scalars operating in parallel. A third conventional solution stores a pre-scaled table, loops through the 399 contexts and performs a table lookup to determine the initial state. However, storing all of the pre-scaled contexts consumes approximately 50 times the area for ROM storage as compared with the first conventional solution. A fourth conventional solution is to loop through a subset of the 399 contexts (i.e., approximately 300 contexts) depending upon the type of slice being processed. In practice, an implementation that uses a subset of the contexts provides only a marginal improvement.

SUMMARY OF THE INVENTION

The present invention concerns a method for controlling an arithmetic codec context. The method generally comprises the steps of (A) reading a current value indicating one of a first condition and a second condition corresponding to a current context of a plurality of predetermined contexts, (B) generating an input state matching (i) an initial state in response to the first condition and (ii) an output state in response to the second condition, wherein the initial state has a predetermined value and the output state has a value generated by the method before receiving the current context and (C) generating a current output state by performing an arithmetic code operation on an input signal using the input state.

The objects, features and advantages of the present invention include providing a method and/or apparatus for a low overhead context initialization for arithmetic video codecs that may (i) incur no slice overhead to initialize contexts, (ii) maximize time available for CABAC processing, (iii) minimize an area of a ROM storing initialization information and/or (iv) provide continuous processing without interruptions.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
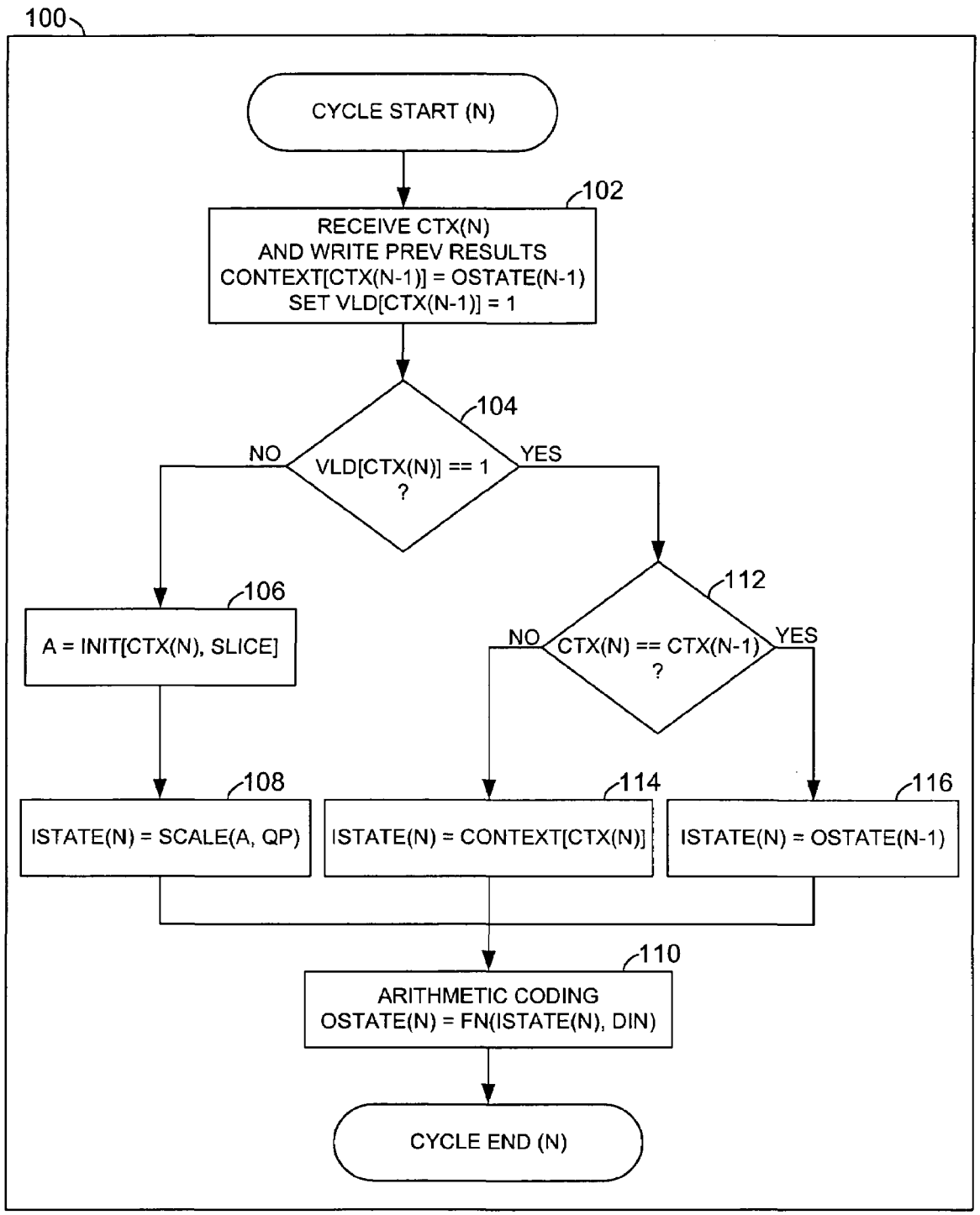
FIG. 1 is a flow diagram of an example method for controlling an arithmetic codec context in accordance with a preferred embodiment of the present invention.

Referring to FIG. 1, a flow diagram of an example method 100 for controlling an arithmetic codec context is shown in accordance with a preferred embodiment of the present invention. The method 100 may be referred to as a context initialization method. The context initialization method 100 generally employs a one-bit by 399 cell memory that generally keeps an overhead time for context initializing short. The one-bit by 399 cell memory may be referred to as a valid (e.g., VLD) memory. The VLD memory may be implemented with a single cycle flash clear capability to minimize initialization overhead. The context initialization method 100 may be executed in each cycle of a CABAC encoder and/or a CABAC decoder.

The context initialization method 100 generally comprises a step 102, a step 104, a step 106, a step 108, a step 110, a step 112, a step 114 and a step 116. At a start of a given cycle "N", the step 102 may (i) receive a current context value (e.g., CTX(N)), (ii) store a prior output state value (e.g., OSTATE(N−1)) generated during a cycle for an arithmetic coding operation and (iii) set a bit in the VLD memory corresponding to a previous context value (e.g., CTX(N−1)) to a valid state (e.g., a logical one state). A state of a bit in the VLD memory corresponding to the current context (e.g., VLD[CTX(N)]) may be examined in step 104.

If the current context bit VLD[CTX(N)] is in an invalid state (e.g., a logical zero state) (e.g., the NO branch of step 104), the context initialization method 100 may proceed to generate an initial value for a current input state (e.g., ISTATE (N)) used by the arithmetic coding operation. Generation of the initial value for the current input state ISTATE(N) may include reading an initialization value (e.g., A) from an initialization (INIT) memory identified by a combination of the current context CTX(N) and a slice identifier (e.g., SLICE) in step 106. The step 108 may scale the initialization value A based on a quantization parameter (e.g., QP) to calculate the current input state ISTATE(N) for the current cycle N. In step 110, the arithmetic coding operation may generate a current output state OSTATE(N) for the current context CTX(N) as a function of the current input state ISTATE(N) and an input data signal (e.g., DIN) being encoded or decoded. The context initialization method 100 may then be repeated for a next cycle N+1 starting again at step 102.

If the current context bit VLD[CTX(N)] is in the valid state (e.g., the YES branch of step 104), step 112 may compare the current context CTX(N) with a prior context CTX(N−1) for the recently completed cycle N−1. If the current context CTX(N) and the prior context CTX(N−1) do not match (e.g., the NO branch of step 112), step 114 may read a value for the current input state ISTATE(N) from a context (CONTEXT) memory. Step 110 may then generate the current output state OSTATE(N) using the current input state ISTATE(N) read from the CONTEXT memory.

If the current context CTX(N) matches the prior context CTX(N−1) (e.g., the YES branch of step 104), step 116 may set the current input state ISTATE(N) value to the prior output state OSTATE(N−1) value. Step 110 may then generate the current output state OSTATE(N) using the prior output state OSTATE(N−1) value copied into the current input state ISTATE(N).

Figure 2:
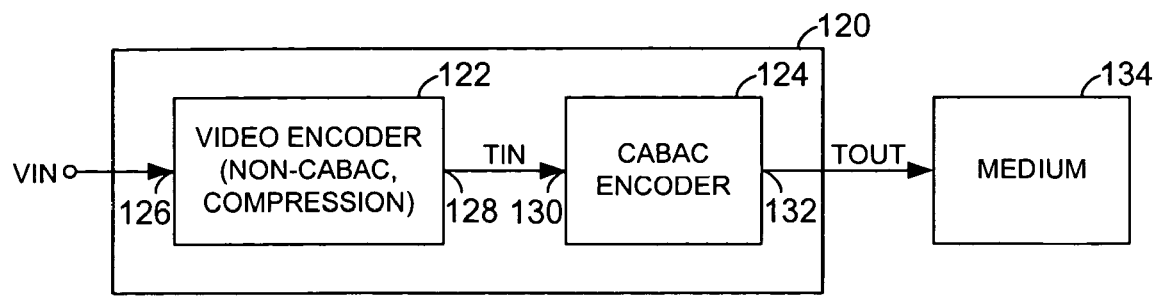
FIG. 2 is a partial block diagram of an example implementation of an encoder apparatus.

Referring to FIG. 2, a partial block diagram of an example implementation of an encoder apparatus (or system) 120 is shown. The encoder apparatus 120 generally comprises a circuit (or block) 122 and a circuit (or block) 124. A signal (e.g., VIN) may be received at an input 126 of the circuit 122. A signal (e.g., TIN) may be transferred from an output 128 of the circuit 122 to an input 130 of the circuit 124. A signal (e.g., TOUT) may be presented at an output 132 of the circuit 124 to a medium 134. The medium 134 may be implemented as a transmission medium and/or a storage medium.

The circuit 122 may be implemented as a video encoder circuit. The video encoder circuit 122 may be operational to generate the signal TIN by compressing the signal VIN. The compression operation may be a non-CABAC operation. The compression operation may be generally compliant with (i) an International Organization for Standardization/International Electrotechnical Commission 14496-10 standard and/or (ii) an International Telecommunication Union-Telecommunications Standardization Sector Recommendation H.264. Hereafter, the ISO/IEC 14496-10 standard and the ITU-T recommendation H.264 may be generally referred to as an "H.264/MPEG4-AVC standard".

The circuit 124 may be implemented as a CABAC encoder circuit. The CABAC encoder circuit 124 may be operational to generate the signal TOUT by encoding the signal TIN. The encoding may be implemented as a context-based adaptive binary arithmetic coding operation. The CABAC encoding may be compliant with the H.264/MPEG4-AVC standard. The CABAC encoder circuit 124 may be configured to implement the context initialization method 100.

The signal VIN may be a video signal or program stream. The signal VIN may be received by the video encoder circuit 122 in an analog or a digital form. The signal VIN may convey images for a standard definition television program, a high definition television program, a common interface format, a quarter common interface format or the like. The images may be arranged as frames and/or fields each having one or more slices with each slice having one or more macroblocks.

The signal TIN may be a compressed version of the signal VIN. The signal TIN may be referred to as an input data signal on a transmission side. The input data signal TIN may comprise I-frames, I-field, P-frames, P-fields, B-frames, B-fields, discrete cosine transform (DCT) coefficients, motion vectors, macroblock prediction errors and the like.

The signal TOUT may be an entropy-encoded version of the input data signal TIN. The signal TOUT may be referred to as an output data signal on the transmission side. The output data signal TOUT may form a portion of a video transport stream presented to the medium 134. The entropy encoding may be implemented as a CABAC encoding. The output data signal TOUT may be generally compliant with the H.264/MPEG4-AVC standard.

Figure 3:
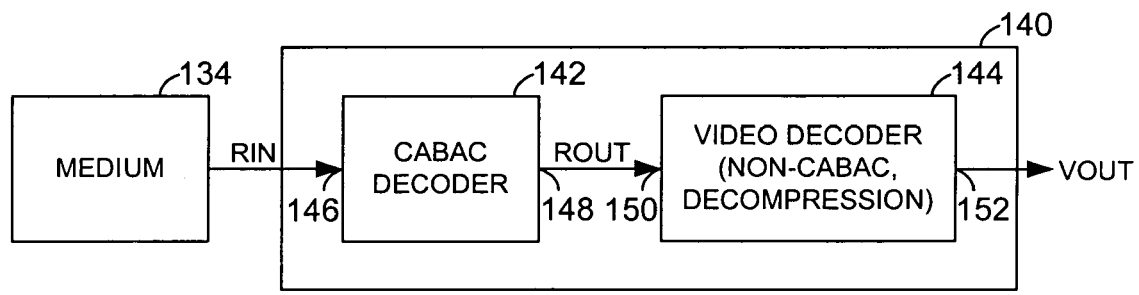
FIG. 3 is a partial block diagram of an example implementation of a decoder apparatus.

Referring to FIG. 3, a partial block diagram of an example implementation of a decoder apparatus (or system) 140 is shown. The decoder apparatus 140 generally comprises a circuit (or block) 142 and a circuit (or block) 144. A signal (e.g., RIN) may be received at an input 146 of the circuit 142 from the medium 134. A signal (e.g., ROUT) may be transferred from an output 148 of the circuit 142 to an input 150 of the circuit 144. A signal (e.g., VOUT) may be presented at an output 152 of the circuit 144. The signal RIN may match the signal TOUT in an error free transfer through the medium 134.

The circuit 142 may be implemented as a CABAC decoder circuit. The CABAC decoder circuit 142 may be operational to generate the signal ROUT by decoding the signal RIN. The decoding may be implemented as a context-based adaptive binary arithmetic coding operation. The CABAC decoding may be generally compliant with the H.264/MPEG4-AVC standard. The CABAC decoder circuit 142 may be configured to implement the context initialization method 100.

The circuit 144 may be implemented as a video decoder circuit. The video decoder circuit 144 may be operational to generate the signal VOUT by decompressing the signal ROUT. The decompression operation may be a non-CABAC operation. The decompression operation may be generally compliant with the H.264/MPEG4-AVC standard.

The signal RIN may be a compressed and encoded video signal. The signal RIN may be referred to as an input data signal on a receive side. The input data signal RIN may be a video transport stream conveyed/stored in the medium 134. The input data signal RIN may be compliant with the H.264/MPEG4-AVC standard.

The signal ROUT may be a decoded version of the input data signal RIN. The signal ROUT may be referred to as an output data signal. The output data signal ROUT generally matches the signal TIN, not accounting for transmission/storage errors and/or encoding/decoding errors.

The signal VOUT may be a video signal or video stream. The video signal VOUT may be an approximation of the video signal VIN. Differences in the video signal VOUT and the video signal VIN may be due to quantization/dequantization operations and discrete cosine transform (DCT)/inverse discrete cosine transform (IDCT) operations in the encoder apparatus 120 and/or the decoder apparatus 140.

Figure 4:
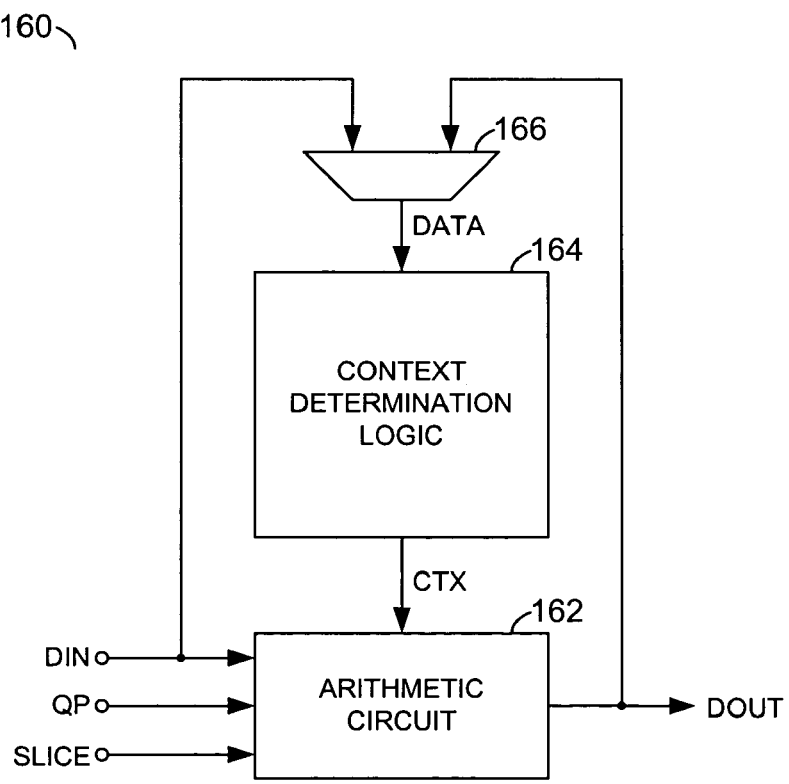
FIG. 4 is a partial block diagram of an example implementation of a CABAC circuit.

Referring to FIG. 4, a partial block diagram of an example implementation of a CABAC circuit 160 is shown. The CABAC circuit 160 may represent the CABAC encoder circuit 124 and the CABAC decoder circuit 142. The input data signal DIN to the CABAC circuit 160 may represent the input data signals RIN and TIN. An output data signal (e.g., DOUT) from the CABAC circuit 160 may represent the output data signals TOUT and ROUT.

The CABAC circuit 160 generally comprises a circuit (or block) 162, a circuit (or block) 164 and a circuit (or block) 166. The input data signal DIN may be received by the circuit 162 and the circuit 166. The output data signal DOUT may be generated by the circuit 162 and received by the circuit 166. A signal (e.g., DATA) may be transferred from the circuit 1.66 to the circuit 164. A signal (e.g., CTX) may be transferred from the circuit 164 to the circuit 162.

The circuit 162 may be referred to as an arithmetic circuit. The arithmetic circuit 162 may be operational to generate the output data signal DOUT by coding the input data signal DIN. The coding may be performed as a function of the signal CTX, a SLICE identifier and a QP value during a current cycle N. The coding may be repeated for consecutive cycles (e.g., N−1, N, N+1, etc.).

The circuit 164 may be referred to as a context determination logic. The context determination logic 164 may be operational to generate the signal CTX based on the signal DATA. The signal CTX may convey the current context CTX(N) for the current cycle N. The context determination logic may parse the input signal DATA and store the parsed information into registers (not shown) to be used later to generate the signal. CTX. The context determination rules may be found in the H.264 specification, hereby incorporated by reference in its entirety.

The circuit 166 may be implemented as a multiplexer. The multiplexer circuit 166 may be operational to route the input data signal DIN and the output data signal DOUT to generate the signal DATA. The multiplexer circuit 166 may route (i) the signal DIN to the signal DATA for CABAC decoding and (ii) the signal DOUT to the signal DATA for CABAC encoding.

Figure 5:
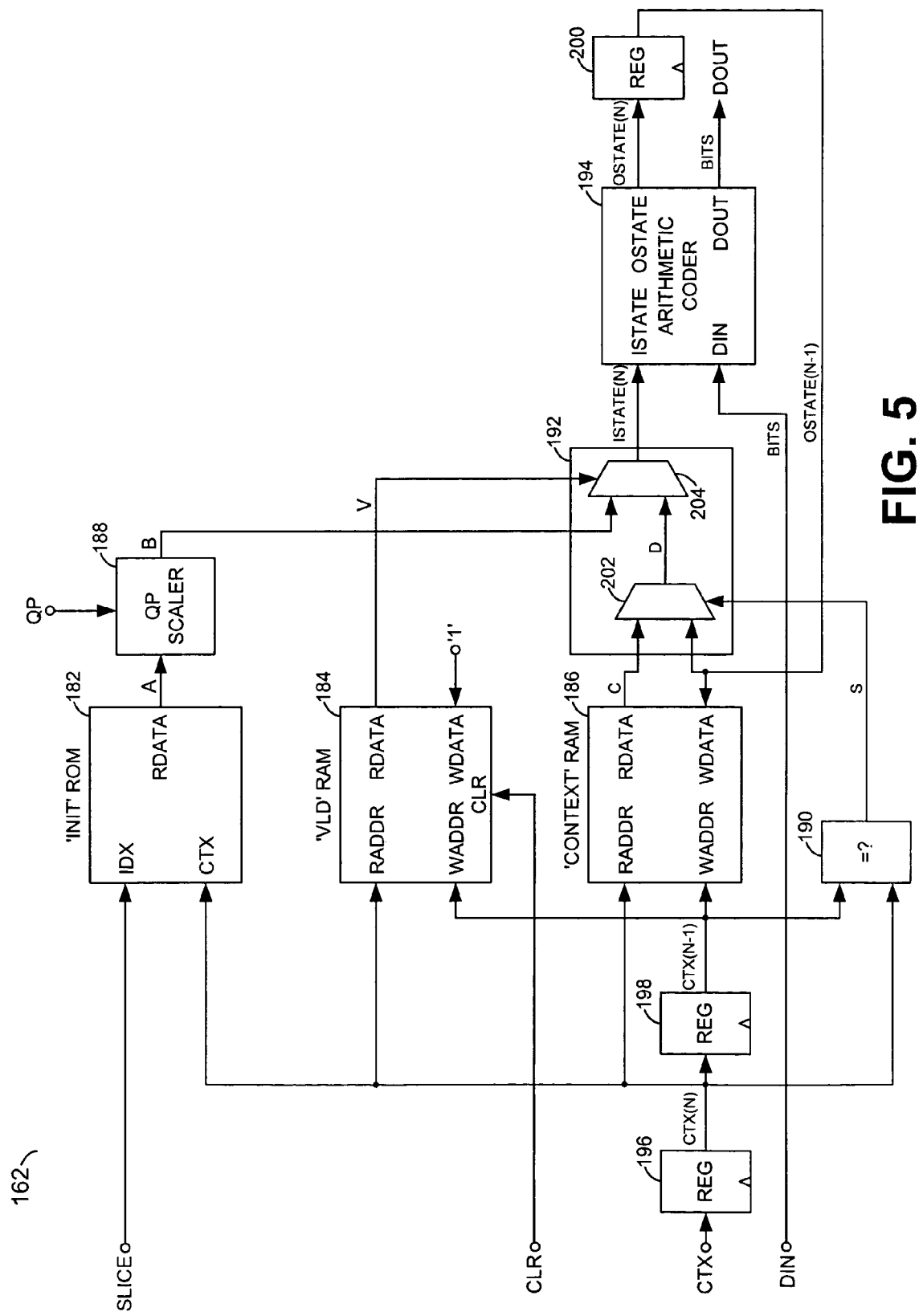
FIG. 5 is a block diagram of an example implementation of an arithmetic circuit.

Referring to FIG. 5, a block diagram of an example implementation of the arithmetic circuit 162 is shown. The arithmetic circuit 162 generally comprises the INIT memory 182, the VLD memory 184, the CONTEXT memory 186, a circuit (or block) 188, a circuit (or block) 190, a circuit (or block) 192, a circuit (or block) 194, a register 196, a register 198 and a register 200. The context signal CTX may be received by the register 196. The input data signal DIN may be received by the circuit 194. The output data signal DOUT may be generated by the circuit 194. The SLICE identifier may be received by the INIT memory 182. The QP value may be received by the circuit 188. A signal (e.g., CLR) may be received by the VLD memory 184.

The initialization value A may be transferred from the INIT memory 182 to the circuit 188. A value (e.g., B) may be transferred from the circuit 188 to the circuit 192. A value (e.g., V) may be transferred form the VLD memory 184 to the circuit 192. A value (e.g., C) may be transferred from the CONTEXT memory 186 to the circuit 192.

The register 196 may store the context signal CTX to presented the current context CTX(N) to the register 198, the INIT memory 182, the VLD memory 184 the CONTEXT memory 186 and the circuit 190. The register 198 may hold the current context CTX(N) for a single cycle to present the prior context CTX(N−1) to the VLD memory 184, the CONTEXT memory 186 and the circuit 190. The circuit 190 may transfer a signal (e.g., S) to the circuit 192.

The current input state ISTATE(N) may be transferred from the circuit 192 to the circuit 194. The current output state OSTATE(N) may be transferred from the circuit 194 to the register 200. The register 200 may hold the current output state OSTATE(N) for a single cycle to generate the prior output state OSTATE(N−1). The prior output state OSTATE (N−1) may be transferred to the CONTEXT memory 186 and the circuit 192.

The INIT memory 182 may be implemented as a read-only memory (ROM). Predetermined initialization values may be programmed into the INIT memory 182. The INIT memory 182 may be addressed in part by the current context CTX(N) and in part by the SLICE identifier.

The VLD memory 184 may be implemented as multiple flip-flops (not shown), one for each predetermined context (e.g., 399 contexts). The VLD memory 184 may receive the current context CTX(N) as a read address. The prior context CTX(N−1) may be used by the VLD memory 184 as a write address. The VLD memory 184 may be configured to clear all of the flip-flops to the invalid state (e.g., the logical zero state) substantially simultaneously upon receipt of the signal in an asserted condition or state. The valid state (e.g., the logical one state) may be received by the VLD memory 184 as write data.

The CONTEXT memory 186 may store each prior output state OSTATE(N−1) received from the register 200. The prior context CTX(N−1) may be used as a write address to control writing of the prior output state OSTATE(N−1) in the CONTEXT memory 186. The current context CTX(N) may be used as a read address to control reading of the stored states as the signal C. The registers 198 and 200 may provide a single cycle delay of the current context CTX(N) and the current output state OSTATE(N) for writing the calculated output state OSTATE into the CONTEXT memory 186.

The circuit 188 may be referred to as a QP scalar circuit. The QP scalar circuit 188 may be operational to generate the value B by scaling the value A according to the QP value. Thus, the value B may be a scaled version of the value A.

The circuit 190 may be implemented as a comparison circuit. The comparison circuit 190 may be operational to generate the signal S by comparing the current context CTX (N) stored in the register 196 with the prior context CTX(N− 1) stored in the register 198. If the current context CTX(N) matches the prior context CTX(N−1), the signal S may be asserted (e.g., the logical one state) to indicate that the consecutive contexts are the same. If the current context CTX(N) and the prior context CTX(N−1) do not match, the signal S may be deasserted (e.g., the logical zero state) to indicate different consecutive contexts.

The circuit 192 may be referred to as a multiplex circuit. The multiplex circuit 192 generally comprises a first multiplexer 202 and a second multiplexer 204. The first multiplexer 202 may have a first input (e.g., 0) to receive the value C and a second input (e.g., 1) to receive the prior output state OSTATE(N−1). The first multiplexer 202 may generate a value (e.g., D) from one of the value C and the prior output state OSTATE(N−1) based on the control of the signal S.

The second multiplexer 204 may have a first input (e.g., 0) to receive the scaled value B and a second input (e.g., 1) to receive the value D. The second multiplexer 204 may generate the current input state ISTATE(N) from one of the value B and the value D based on the control of the signal V.

The circuit 194 may be implemented as an arithmetic coder circuit. The arithmetic coder circuit 194 may be operational to generate the current output state OSTATE(N) and the output data signal DOUT based upon the current input state ISTATE (N) and the input data signal DIN.

The initialization method 100 may be implemented by the memories, circuits and registers of the arithmetic circuit 162. In a single cycle, the VLD memory 184 may be cleared such that each bit representing a single predetermined context may be forced into the invalid state (e.g., the logical zero state). When the current context CTX(N) is considered for a first time since the VLD memory 184 was cleared, the particular bit corresponding to the current context CTX(N) may direct the multiplex circuit 192 to set the current input state ISTATE (N) from the INIT memory 182. Once accessed, particular bit in the VLD memory 184 may be set to the valid state (e.g., the logical one state). Any subsequent access of the particular bit may read in the valid state in the value V causing the multiplex circuit 192 to route an earlier stored output state OSTATE (e.g., in the value C) to the arithmetic coder 194. If the current context CTX(N) and the prior context CTX(N−1) match, the comparison circuit 190 may direct the multiplex circuit 192 to route the prior output state OSTATE(N−1) back to the arithmetic coder circuit 194 as the current input state ISTATE(N).

Another embodiment on the present invention may incur an initialization overhead only for uninitialized contexts. The partial initialization embodiment may reduce a number of initializations to a minimum amount. In some cases, however, processing of a common input data signal DIN may end up using all contexts that would be initialized anyways.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for controlling an arithmetic codec context, comprising the steps of:
   (A) reading a current value indicating one of a first condition and a second condition corresponding to a current context of a plurality of predetermined contexts;
   (B) generating an input state matching (i) an initial state in response to said first condition and (ii) an output state in response to said second condition, wherein said initial state has a predetermined value and said output state has a value generated in a prior cycle completed before receiving said current context in a current cycle; and
   (C) generating a current output state by performing an arithmetic code operation on an input signal using said input state.

2. The method according to claim 1, wherein step (B) comprises the sub-step of:
   generating said input state from a prior output state in response to said current context matching a prior context of said predetermined contexts.

3. The method according to claim 1, further comprising the step of:
   setting said current value to said second condition after generating said input state.

4. The method according to claim 1, further comprising the step of:
   clearing a plurality of said current values to said first condition substantially simultaneously in response to a clear signal being asserted.

5. The method according to claim 1, further comprising the step of:
   storing said current output state as said output state corresponding to said current context.

6. The method according to claim 1, further comprising the step of:
   scaling said initial state prior to generating said input state.

7. The method according to claim 1, further comprising the steps of:
   generating an output signal by performing said arithmetic code operation on said input signal; and
   generating a video signal by decompressing said output signal.

8. The method according to claim 7, wherein said decompressing is compliant with at least one of (i) an International Organization for Standardization/International Electrotechnical Commission 14496-10 standard and (ii) an International Telecommunication Union-Telecommunications Standardization Sector Recommendation H.264.

9. The method according to claim 1, further comprising the steps of:
   generating said input signal by compressing a video signal.

10. The method according to claim 9, wherein said compressing is compliant with at least one of (i) an International Organization for Standardization/International Electrotechnical Commission 14496-10 standard and (ii) an International Telecommunication Union-Telecommunications Standardization Sector Recommendation H.264.

11. An apparatus comprising:
    a first memory configured to store a plurality of initial states corresponding to one of a plurality of predetermined contexts;
    a second memory configured to store a plurality of control values each indicating one of a first condition and a second condition corresponding to one of said predetermined contexts;
    a third memory configured to store a plurality of output states each corresponding to one of said predetermined contexts; and
    an arithmetic coder configured to generate an output state by performing an arithmetic code operation on an input signal using an input state, wherein said input state matches (i) one of said initial states in response to a current control value of said control values having said first condition and (ii) one of said output states in response to said current control value having said second condition.

12. The apparatus according to claim 11, further comprising a multiplex circuit coupled to an output of each of (i) said first memory, (ii) said second memory, (iii) said third memory and (iv) said arithmetic coder and configured to generate said input state in response to one of said control values.

13. The apparatus according to claim 12, further comprising a comparator configured to generate a signal to control said multiplex circuit in response to comparing a current context of said predetermined contexts with a prior context of said predetermined contexts.

14. The apparatus according to claim 12, further comprising a scalar circuit disposed between said first memory and said multiplex circuit and configured to scale said initial states read from said first memory.

15. The apparatus according to claim 11, wherein said first memory is configured to transfer one of said initial states in response to both a current context of said predetermined contexts and a signal identifying a current slice within said input signal.

16. The apparatus according to claim 11, wherein said first memory, said second memory, said third memory and said arithmetic coder form a content-based adaptive binary arithmetic coder.

17. The apparatus according to claim 16, wherein said context-based adaptive binary arithmetic coder is configured to decode said input signal.

18. The apparatus according to claim 16, wherein said context-based adaptive binary arithmetic coder is configure to encode said input signal.

19. The apparatus according to claim 16, wherein said content-based adaptive binary arithmetic coder is compliant with at least one of (i) an International Organization for Standardization/International Electrotechnical Commission 14496-10 standard and (ii) an International Telecommunication Union-Telecommunications Standardization Sector Recommendation H.264.

20. An apparatus comprising:
   means for reading a current value indicating one of a first condition and a second condition corresponding to a current context of a plurality of predetermined contexts;
   means for generating an input state matching (i) an initial state in response to said first condition and (ii) an output state in response to said second condition, wherein said initial state has a predetermined value and said output state has a value generated by said apparatus before receiving said current context; and
   means for generating a current output state by performing an arithmetic code operation on an input signal using said input state.

* * * * *